United States Patent [19]
Fernandez et al.

[11] Patent Number: 5,462,814
[45] Date of Patent: Oct. 31, 1995

[54] METHOD AND APPARATUS FOR PROVIDING AN ELECTRONIC LOCKOUT FOR A RECHARGEABLE BATTERY

[75] Inventors: Jose M. Fernandez, Lawrenceville; Vernon Meadows, Lilburn, both of Ga.

[73] Assignee: Motorola, Inc., Schaumburg, Ill.

[21] Appl. No.: 364,566

[22] Filed: Dec. 27, 1994

[51] Int. Cl.$^6$ .............................. H01M 10/46; H02J 7/10
[52] U.S. Cl. .................................. 429/7; 429/90; 320/2; 320/32
[58] Field of Search ................. 429/61, 90, 91, 429/92, 7; 320/2, 29, 30, 32, 39, 43, 44, 49, 54, 55, 57; 323/271, 277, 285

[56] References Cited

U.S. PATENT DOCUMENTS

| | | | |
|---|---|---|---|
| 5,177,426 | 1/1993 | Nakanishi et al. | 320/2 X |
| 5,237,257 | 8/1993 | Johnson et al. | 320/2 |
| 5,411,816 | 5/1995 | Patino | 429/7 |

*Primary Examiner*—Anthony Skapars
*Attorney, Agent, or Firm*—Frank M. Scutch

[57] ABSTRACT

A rechargeable battery (100) includes a lockout circuit (200) for preventing rechargeable cells (101) from being charged when connected to a charging system (103) which does not include a data node (109). The lockout circuit (200) includes a lockout switch (113) which is biased by a voltage applied to data node (109). Data node (109) provides a closed circuit to allow rechargeable cells (101) to be charged only with charging systems which utilize a correct charging regimen.

7 Claims, 1 Drawing Sheet

METHOD AND APPARATUS FOR PROVIDING AN ELECTRONIC LOCKOUT FOR A RECHARGEABLE BATTERY

TECHNICAL FIELD

This invention relates in general to rechargeable batteries and more particularly to charging of rechargeable cells.

BACKGROUND

An increasing number of portable electronic products are available today which operate on a battery source within the device. These products include such things as cellular telephones, portable radios, pagers and voice recorders which are conveniently mobile and operate using rechargeable batteries. Many different battery chemistries have been used for many years which meet the need for recharging capability. Probably the most popular chemistries include nickel cadmium and nickel metal hydride. A relatively new chemistry, however, generally referred to as lithium ion, enables a cell to be recharged while offering many advantages over other types of rechargeable cells. These benefits primarily are directed to low weight and overall size with a high energy density. One unique factor to be considered when using a lithium ion cell is its charging scheme. A lithium ion cell is not charged in the same manner as rechargeable cells utilizing a nickel chemistry.

Since a lithium ion battery includes a housing which is meant to be adaptable and retrofitable to existing portable products, a problem arises in preventing foreign or alien charging systems from being used with the lithium ion battery. Although the lithium ion battery may have the correct shape to fit into a charging system, it may not be intended to be charged by that system. Moreover, charging systems which have an inappropriate charging regimen should not be used with a lithium ion cell since many safety concerns arise due to the different charging characteristics between rechargeable cells. Thus, a system and method are needed to prevent a battery which may physically fit into an inappropriate or non-compatible charging system from being accidentally charged.

DETAILED DESCRIPTION OF THE PREFERRED EMBODIMENT

Figure 1:
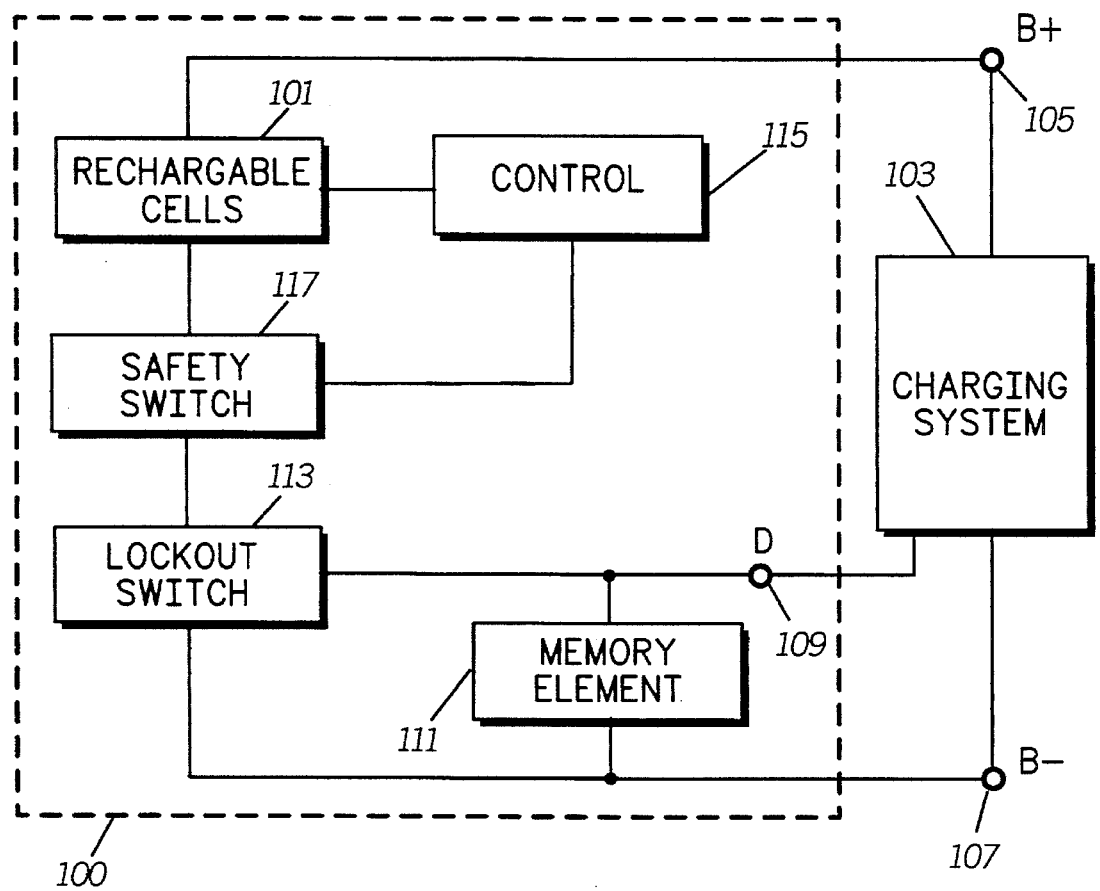
FIG. 1 is a block diagram showing operation of a lockout system in accordance with the invention.

Referring now to FIG. 1, a rechargeable battery system 100 includes one or more rechargeable cells 101 which are charged using a charging apparatus or charging system 103 connected at charging node 105 and virtual ground node 107. When using a lithium ion cells or the like, a data node 109 is generally included. Data node 109 is used to convey charging information from an attached memory element 111 to charging system 103. The charging information generally relates to cell type, cell capacity, and charging characteristics which can be used by a "smart" charger to determine the appropriate charging regimen to be used to charge rechargeable cells 101. In order to prevent charging by an inappropriate charging system, a lockout switch 113 is connected serially between data node 109 and virtual ground node 107. Lockout switch 113 is actuated by voltage applied to data node 109 by charging system 103 and acts to provide a connection or continuity between rechargeable cells 101 and virtual ground node 107. This connection provides a closed circuit between rechargeable cells 101 and charging system 103. Moreover, a control circuit 115 is attached to rechargeable cells 101 and is used to provide a control signal to control safety switches 117. The control signal provided by control circuit 115 to actuate safety switches 117, connected serially with rechargeable cells 101 and charging system 103, in the event that an overvoltage condition or undervoltage condition of rechargeable cells 101 is detected. This provides a safety system to prevent rechargeable cells 101 from being overcharged or depleted to a level where they would be damaged.

Figure 2:
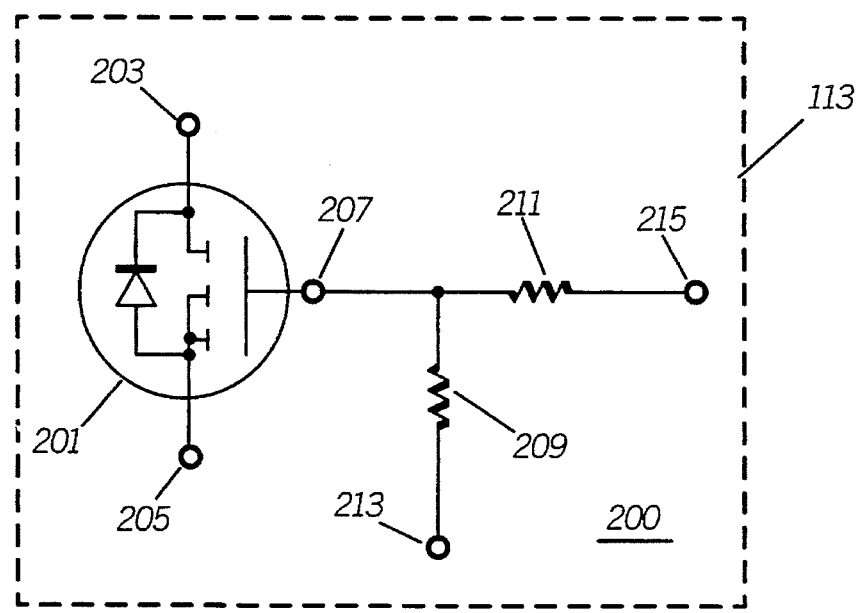
FIG. 2 is a schematic diagram showing a the lockout circuit in accordance with a preferred embodiment of the invention.

FIG. 2 illustrates a lockout circuit 200 in accordance with a preferred embodiment of the invention like that shown by lockout switch 113 shown in FIG. 1. Lockout circuit 200 includes a N-channel MOSFET 201 which is used as a switch to control the connection between rechargeable cells connected at point 203 to a virtual ground node connected at point 205. The gate 207 of N-channel MOSFET 20 1 is connected to a resistor divider circuit comprised of resistor 209 and resistor 211. Resistor 209 is attached to virtual ground node at point 213 and resistor 211 attached to a data node at point 215. Resistor 209 is used to eliminate bias potential when no voltage is present on the data node connected at point 213. Resistor 211 is used to buffer an attached memory circuit, like that shown in FIG. 1, for a gate capacitance present at N-channel MOSFET 201 to preserve integrity of any data stored in the memory circuit.

In operation, when rechargeable battery system 100 is connected or inserted into a charging system 103 which is not compatible with rechargeable cells 101, no voltage is applied to data node 109 since there is no electrical contact provided for this function is standard charging systems. Accordingly, N-channel MOSFET 201 in lockout circuit 200 remains unbiased. This effectively leaves an open circuit between safety switches 117 and virtual ground node 107 preventing an incompatible charging system, connected to charging node 105 and virtual ground node 107 from applying a charging voltage to rechargeable cells 101. When battery 100 is connected or inserted into a charging system 103 which is compatible with rechargeable cells 101, data node 109 is provided which supplies a biasing voltage to N-channel MOSFET 201. When properly biased, N-channel MOSFET 201 becomes a short circuit allowing current to pass and charge rechargeable cells 101.

In summary, lockout circuit 200 effectively locks out all chargers which are incompatible with current rechargeable batteries that do not have a data node 109. These batteries currently include lithium ion type batteries and the like which are shaped essentially like other types of rechargeable cells. Since the lithium ion battery will fit and/or connect to incompatible charging systems, lockout circuit 200 prevents use with an incompatible charging system which would damage a lithium ion battery.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A rechargeable battery including a lockout circuit located within a battery system for preventing a cell located within said battery system from being recharged with an incompatible charging system comprising:

at least one rechargeable cell connected to a charging node and a ground node;

a memory element connected to a data node and said ground node for conveying charging information to said battery system;

a lockout switch connected to said at least one rechargeable cell for connecting said at least one rechargeable cell to said ground node; and wherein said charging system provides a voltage on said data node to control operation of said lockout switch connecting said at least one rechargeable cell to said ground node for charging said at least one rechargeable cell.

2. A rechargeable battery as in claim 1 further comprising:

a control circuit attached to said at least one rechargeable cell and a plurality of control switches for controlling the connection of said at least one cell to said charging system.

3. A battery system as in claim 1 wherein said charging system is used to charge nickel metal hydride cells.

4. A rechargeable battery as in claim 1 wherein said lockout switch is a MOSFET.

5. A rechargeable battery as in claim 1 wherein said at least one rechargeable cell is a lithium ion cell.

6. A method of charging a rechargeable battery which is connected to a compatible charging system, said rechargeable battery including a charging node, data node and ground node, said method comprising the steps of:

detecting at a switch a voltage provided at said data node by a charging apparatus;

closing said switch in response to said voltage; and connecting at least one cell in said rechargeable battery to said charging apparatus in response thereto.

7. A method as in claim 6 wherein said connecting step includes attaching said at least one cell to said ground node to provide a closed circuit with said charging node.

* * * * *